(12) United States Patent
Hui et al.

(10) Patent No.: US 7,345,812 B2
(45) Date of Patent: Mar. 18, 2008

(54) METHOD AND APPARATUS FOR USE OF III-NITRIDE WIDE BANDGAP SEMICONDUCTORS IN OPTICAL COMMUNICATIONS

(75) Inventors: Rongqing Hui, Lenexa, KS (US); Hong-Xing Jiang, Manhattan, KS (US); Jing-Yu Lin, Manhattan, KS (US)

(73) Assignee: University of Kansas, Lawrence, KS (US)

( * ) Notice: Subject to any disclaimer, the term of this patent is extended or adjusted under 35 U.S.C. 154(b) by 204 days.

(21) Appl. No.: 10/783,972

(22) Filed: Feb. 20, 2004

(65) Prior Publication Data
US 2004/0218259 A1   Nov. 4, 2004

Related U.S. Application Data

(60) Provisional application No. 60/453,636, filed on Mar. 10, 2003, provisional application No. 60/449,228, filed on Feb. 21, 2003.

(51) Int. Cl.
*H01S 5/00* (2006.01)

(52) U.S. Cl. .................... 359/344; 385/8; 385/40; 438/31; 438/604

(58) Field of Classification Search ................ 359/344; 385/8, 40; 438/31, 604
See application file for complete search history.

(56) References Cited

U.S. PATENT DOCUMENTS

| | | | | |
|---|---|---|---|---|
| 3,982,261 | A * | 9/1976 | Antypas | 372/44.01 |
| 5,909,303 | A * | 6/1999 | Trezza et al. | 359/248 |
| 6,140,669 | A * | 10/2000 | Lozykowski et al. | 257/103 |
| 6,255,669 | B1 * | 7/2001 | Birkhahn et al. | 257/89 |
| 6,456,429 | B1 * | 9/2002 | Wu | 359/344 |
| 6,630,693 | B1 * | 10/2003 | Martin et al. | 257/98 |
| 6,687,461 | B1 * | 2/2004 | MacFarlane et al. | 398/82 |
| 6,909,536 | B1 * | 6/2005 | Walker et al. | 359/344 |
| 2002/0094002 | A1 * | 7/2002 | Amano et al. | 372/45 |
| 2003/0017625 | A1 * | 1/2003 | Litvin | 438/3 |
| 2003/0021014 | A1 * | 1/2003 | Barenburg et al. | 359/344 |

OTHER PUBLICATIONS

Long et al., "GaN linear electro-optic effect", Applied Physics Letters, vol. 67, (Sep. 4, 1995), pp. 1349-1351.*

* cited by examiner

*Primary Examiner*—Deandra M. Hughes
*Assistant Examiner*—Eric Bolda
(74) *Attorney, Agent, or Firm*—Schwegman, Lundberg & Woessner, P.A.; Timothy E. Bianchi

(57) ABSTRACT

The present disclosure relates to the use of III-nitride wide bandgap semiconductor materials for optical communications. In one embodiment, an optical device includes an optical waveguide device fabricated using a III-nitride semiconductor material. The III-nitride semiconductor material provides for an electrically controllable refractive index. The optical waveguide device provides for high speed optical communications in an infrared wavelength region. In one embodiment, an optical amplifier is provided using optical coatings at the facet ends of a waveguide formed of erbium-doped III-nitride semiconductor materials.

32 Claims, 15 Drawing Sheets

METHOD AND APPARATUS FOR USE OF III-NITRIDE WIDE BANDGAP SEMICONDUCTORS IN OPTICAL COMMUNICATIONS

CROSS-REFERENCE TO RELATED APPLICATIONS

This application claims the benefit of U.S. Provisional Application No. 60/449,228, filed on Feb. 21, 2003 and U.S. Provisional Application No. 60/453,636, filed on Mar. 10, 2003, under 35 U.S.C. § 119(e), which are hereby incorporated by reference in their entirety.

STATEMENT OF GOVERNMENT RIGHTS

The invention described herein was made with government support under National Science Foundation Grant Number DMR-9902431; National Science Foundation Grant Number 28030; and Department of Energy Grant Number ED-FG03-96ER45604. The United States Government has certain rights in the invention.

FIELD OF THE INVENTION

The present subject matter relates generally to optical communications and more particularly to method and apparatus for the use of III-nitride wide bandgap semiconductors in optical communications.

BACKGROUND OF THE INVENTION

The explosive growth of Internet traffic has brought a bandwidth hungry and a critical need to manage huge volumes of information. Although fiber-optic communications have enjoyed almost unprecedented success in the past decade, to sustain the long-term growth of information transfer capacity, technological breakthrough must come from new materials, fundamental optical devices and subsystems. There is an intensive pressure to develop cost-effective, high quality integrated photonics circuits, allowing denser, faster, cheaper, more efficient optical signal processing.

In order to make full use of the wide optical bandwidth provided by optical fiber, more wavelength channels have been used in wavelength division multiplexed (WDM) optical networks. Among others, WDM optical demultiplexers, wavelength routers and optical amplifiers are fundamental devices in WDM optical networks. Present opto-mechanical switches and present thermal tuning of silica-based array waveguide grating (AWG) in use are not fast enough to perform optical packet switches. InP-based AWG were attempted, which may be switched by carrier injection and potentially have higher speed. However, due to high refractive index of the material and small waveguide size, InP-based AWG have unacceptable high optical loss and temperature sensitivity.

There is a need in the art for improved method and apparatus for optical communications, particularly high-speed optical switches and wavelength routers, that have acceptable amounts of optical loss and temperature sensitivity.

SUMMARY OF THE INVENTION

The present application relates to method and apparatus for the use of III-nitride wide band gap semiconductors in optical communications. In one embodiment, an optical device includes an optical waveguide device fabricated using a III-nitride semiconductor material. The III-nitride semiconductor material provides for an electrically controllable refractive index. The optical waveguide device is configured for optical communications in an infrared wavelength region. In one further embodiment, the III-nitride semiconductor material is an erbium-doped III-nitride semiconductor material.

In one embodiment, an optical device includes a plurality of waveguides. At least one waveguide of the plurality of waveguides is fabricated using III-nitride semiconductor material. The optical device also includes carrier injection means for electrically adjusting a refractive index of the at least one waveguide.

In one embodiment, an optical wavelength router includes at least one input port having a plurality of independent wavelength channels, a plurality of output ports, and means for routing each wavelength channel of the plurality of independent wavelength channels to a designated output port selected from the plurality of output ports. The means for routing includes one or more optical waveguide devices fabricated using III-nitride material.

In one embodiment, to make an optical waveguide, a heterostructure is formed with at least two III-nitride materials selected for infrared wavelength operations. The heterostructure is provided with electrical contacts for carrier injection. In one further embodiment, the heterostructure is formed with at least two erbium doped III-nitride materials.

In one embodiment, one or more optical waveguide devices fabricated using III-nitride semiconductor material are used for infrared wavelength optical communications. Carrier injection is performed to at least one of the optical waveguide devices to modulate a refractive index of the III-nitride semiconductor material.

This Summary is an overview of some of the teachings of the present application and not intended to be an exclusive or exhaustive treatment of the present subject matter. Further details about the present subject matter are found in the detailed description and appended claims. Other aspects of the invention will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION OF THE INVENTION

Figure 1:
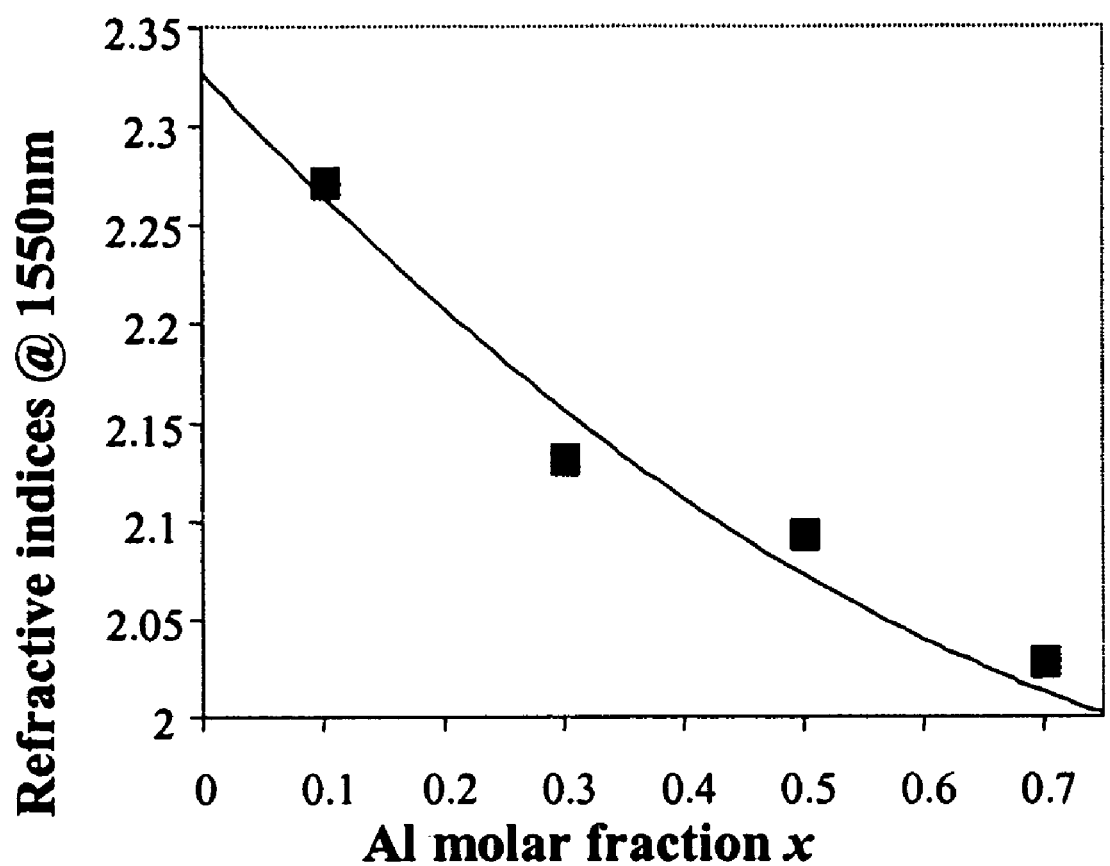
FIG. 1 is a graph showing measured refractive index of $Al_xGa_{1-x}N$ films at 1550 nm versus Al molar fraction x, according to one embodiment of the present subject matter.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. The following detailed description provides examples, and the scope of the present invention is defined by the appended claims and their equivalents.

It should be noted that references to "an", "one", or "various" embodiments in this disclosure are not necessarily to the same embodiment, and such references contemplate more than one embodiment.

This disclosure describes solutions to the foregoing issues and to several other problems which will be appreciated by those of skill in the art upon reading and understanding the present application. The present subject matter provides method and apparatus for, among other things, the use of III-nitride wide band gap semiconductors for infrared (IR) applications in fiber-optical communications.

III-nitride optoelectronic devices offer benefits including UV/blue emission, the ability to operate at very high temperatures and power levels due to their mechanical hardness and larger band gaps, large band offsets of 2.8 eV or 4.3 eV for GaN/AlGaN or InGaN/AlGaN heterostructures allowing novel quantum well (QW) devices, and high emission efficiencies. The research in III-nitrides has been so far focused on their applications in the blue/UV optoelectronic devices. Our recent work revealed that the refractive index of $Al_xGa_{1-x}N$ is variable from 2.17 for GaN to 2.02 for $Al_{0.3}Ga_{0.7}N$ in the 1550 nm wavelength window. These index values are much better matched to the index of optical fiber (which is 1.5) and are much smaller than the index of InP (which is 3.2) in the 1550 nm wavelength region. The index-controllable nature of $Al_xGa_{1-x}N$ makes them useful for optical waveguide devices. In varying embodiments, the refractive index and the index-controllable nature provide a number of embodiments of photonics devices with unprecedented properties and functions. Since III-nitrides are semiconductor materials, carrier injection can be used to modulate the refractive index and change the phase delay of the waveguide. Carrier injection is performed by applying a voltage onto a III-nitride material or by injecting a current into the III-nitride material. Adding an electrode on each of the interference arms of an AWG made by GaN, for example, could make the wavelength demultiplexer switchable at high speed.

One application of III-nitrides in the 1550 nm wavelength region is to make electrically pumped waveguide optical amplifiers. Currently, an InGaAsP-based semiconductor optical amplifier (SOA) has the carrier lifetime on the order of sub-nanosecond due to the nature of the band-to-band recombination in semiconductors. It is therefore not suitable for the applications in WDM optical systems because of the fast cross-gain saturation induced crosstalk between different wavelength channels. Erbium (Er)-doped fiber amplifiers (EDFAs) are optically pumped with typical carrier lifetimes on the order of 10 ms and a typical length on the order of 20 meters. Such a length makes EDFAs inadequate for integration with many other functional photonics devices. III-nitride semiconductors appear to be excellent host materials for erbium ions. Optical emission around 1550 nm in Er-implanted GaN films has been experimentally observed. Electrical pumping on GaN/InGaN heterostructures, for example, generates photons at the wavelength of approximately 400 nm, which can be used to optically excite the erbium ions. Since erbium has much higher absorption efficiency in the short wavelengths than the currently used pumping wavelengths of either 980 nm or 1480 nm, the amplifier can potentially be made very short. In varying embodiments, the novel waveguide optical amplifier is integrated with other functional optical devices, including, but not being limited to, integrated wavelength routers, light sources and detectors. Other devices may be produced with do not depart from the scope of the teachings provided herein.

Wavelength Routers

Silica-based AWGs have been used as WDM optical multiplexers and demultiplexers. With the rapid advancement of photonics integrated circuit (PIC) technology, silica-based AWGs are capable of splitting more than 80 wavelength channels with channel spacing of less than 25 GHz. Since silica is not a semiconductor material and hence purely passive, silica-based AWGs are usually not tunable, or can only be slowly tuned by thermal effect. Presently, all-optical wavelength routers are typically made by a combination of WDM demultiplexers and mechanical optical switches. Because of the slow speed of mechanical optical switches, wavelength routing in optical networks are currently limited at circuit switch level. Although an InP-based planar waveguide PIC can be made tunable with carrier injection, due to its high refractive index and small waveguide size, an InP-based PIC has high scattering loss and high coupling loss with optical fibers.

Waveguide Optical Amplifiers

Optical amplifier is another fundamental device in fiber-optic networks. Currently, there are two types of commonly used optical amplifiers: semiconductor optical amplifier (SOA) and Er-doped fiber amplifier (EDFA). Usually an SOA is made by anti-refraction coating at each side of a semiconductor laser to disable the cavity effect. SOAs working in 1550 nm wavelength window are typically made by InGaAsP. SOAs are electrically pumped and have small sizes. However, due to the band-to-band recombination nature, the carrier lifetimes in SOAs are short (in the sub-nanosecond range), which made SOAs generally unsuitable for use in WDM systems. The reason is that cross-gain saturation may induce unacceptable crosstalk between wavelength channels. An EDFA is made by a piece of Er-doped optical fiber and an external optical pump. Powerful optical pump injecting into the Er-doped fiber creates population inversion of the erbium, thus providing a gain medium for incoming optical signals in the 1550 nm wavelength window. Since the carrier lifetime in the metastable state of erbium is on the order of 10 milliseconds, the optical gain variation is much slower than signal data rate. Therefore, cross gain saturation between different wavelength channels is not likely to happen. Current wavelength choices for the pump lasers are 1480 nm and 980 nm. Although external pumping at a wavelength lower than 700 nm has higher absorption efficiencies, it is difficult to find good semiconductor laser sources. Because of the relatively low absorption efficiency for the external pumping at 980 nm or 1480 nm, an EDFA is usually much longer than an SOA. Although an EDFA has very small connection loss with optical fibers, its typical length is on the order of 20 meters, thus being generally excluded from PICs. It is desirable to have electrically pumped and integratable optical amplifiers for WDM optical networks.

Optical Waveguides Using III-nitride Materials

III-nitride wide band gap semiconductors, including GaN, AlGaN, InGaN, and InAlGaN have emerged as an important materials system for applications in areas of optoelectronic devices. III-nitride optoelectronic devices offer benefits including the ability to operate at very high temperatures and power levels due to their mechanical hardness and larger band gaps and the ability to operate at high speed due to the intrinsically rapid radiative recombination rates. The large band offsets of 2.8 eV or 4.3 eV for GaN/AlGaN or InGaN/AlGaN heterostructures allow novel quantum well (QW) devices to be made with high emission efficiencies. Due to the unique properties of III-nitride wide bandgap semiconductors, III-nitride based devices may operate at much higher voltages and power levels for any dimensional configuration and in harsher environments. III-nitride semiconductors are also expected to provide much lower temperature sensitivity, which is another crucial advantage for optical communication applications.

Our work revealed that the refractive index of III-nitrides in the 1550 nm wavelength region is approximately 2.17 (for GaN). This index value is better matched to optical fiber than InP in the same wavelength region. The refractive index variation of III-nitride devices can be achieved by alloying GaN with InN (InGaN), AlN (AlGaN), or InAlN (InAlGaN). Because of the wide band gap, III-nitrides have a good transparency in the IR wavelength region, which makes them an ideal material for passive optical waveguide devices. Additionally, carrier injection in heterostructures of GaN/InGaN, GaN/AlGaN, and GaN/InAlGaN each provide high-speed modulation of refractive index in waveguides. This unique characteristic is utilized to make fast switchable integrated optical phasor devices. Furthermore, the optical propagation loss in GaN around the 1550 nm wavelength region is very small (better than InP).

III-nitride semiconductors are excellent host materials for erbium ions. Optical emission at 1.54 μm in Er-implanted GaN films has been experimentally observed. In particular, GaN and AlGaN epilayers doped with erbium ions have shown a highly reduced thermal quenching of the erbium luminescence intensity from cryogenic to elevated temperatures, as compared to other host materials such as Si and GaAs. The remarkable thermal stability of the erbium emission may be due to the large energy bandgap of the III-nitride materials, as well as to the optical inactivity of material defects in III-nitride films. Electrical pumping on GaN/InGaN heterostructures generates photons at the wavelength of approximately 400 nm. If erbium ions are doped into GaN/InGaN heterostructures, the blue photons generated may be used as an optical pump for the erbium. When the erbium ions are excited to the metastable energy level, the structure can then be used to amplify IR optical signals in the 1550 nm wavelength region. Since erbium has very high absorption efficiency in the blue wavelength region, the waveguide amplifier can be made short in length. Another advantage of waveguide optical amplifier is the option of integration with other functional optical devices, including, but not being limited to, integrated wavelength routers, light sources, and detectors.

In order to use III-nitrides in the IR wavelength region and explore their potential applications in fiber-optic communications, their optoelectronic properties must be characterized. We have characterized the optical properties of $Al_xGa_{1-x}N$ films in IR wavelength region with different Al molar fractions. The dependence of refractive index on Al molar fractions is a key parameter for the design of planar lightwave circuits (PLC). FIG. 1 shows values of refractive index of $Al_xGa_{1-x}N$ films at 1550 nm measured at several Al molar fraction values. The relationship between the refractive index and the Al molar fraction x can be expressed by a polynomial expression as shown in FIG. 1. The monotonic behavior of the Al$_x$Ga$_{1-x}$N refractive index, which decreases as the Al molar fraction increases, opens the possibility for the design of PLC and functional optical waveguide devices.

Figure 2A:
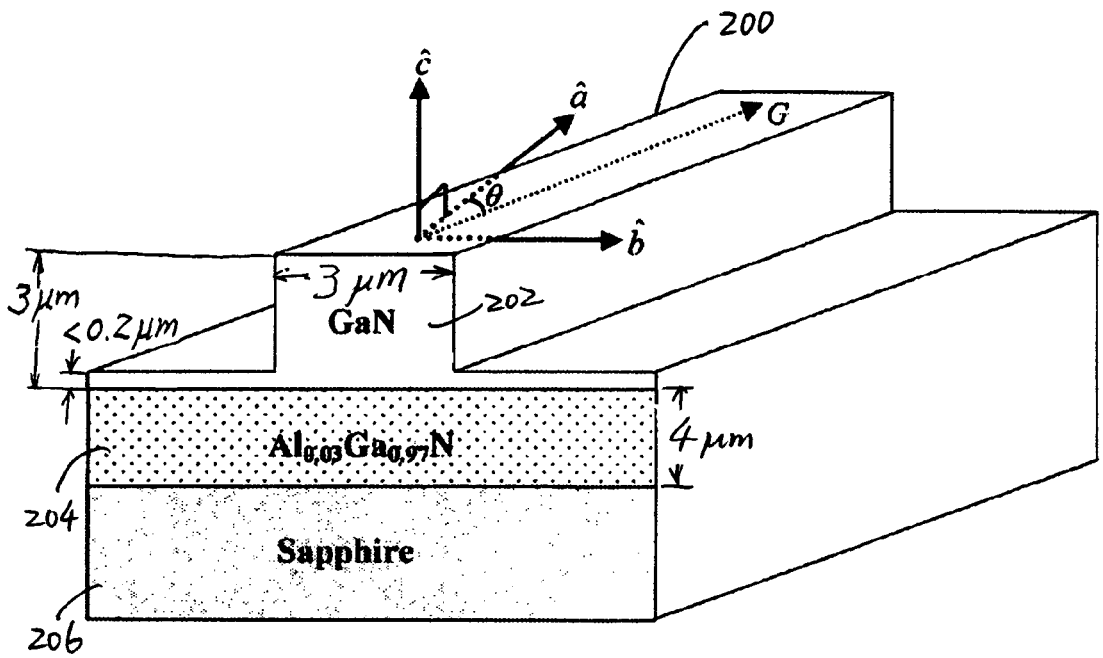
FIG. 2A illustrates an optical waveguide according to one embodiment of the present subject matter.

We designed and fabricated single-mode optical waveguides based on the GaN/AlGaN heterostructure. FIG. 2A illustrates one embodiment of a single-mode optical waveguide 200. Waveguide 200 has a GaN waveguide core 202 having an about 3 µm×3 µm cross-section and an Al$_{0.03}$Ga$_{0.97}$N substrate 204 that is about 4-µm thick. Al$_{0.03}$Ga$_{0.97}$N substrate 204 is grown on sapphire 206. Sapphire is used as an example of the substrate material for illustrative purposes only in the discussions below in this document. Alternatives to the sapphire as the substrate material include, but are not limited to, silicon carbide (SiC), silicon (Si), and gallium arsenide (GaAs). FIG. 2A shows the Cartisian coordinate of GaN crystal. The crystal lattice of GaN has a hexagonal configuration on the a-b plane, which is perpendicular to the crystal c-axis. Waveguide 200 has an orientation angle ? with respect to the a-axis of the a-b plane. According to a beam propagation method (BPM) simulation, this waveguide has a single transversal mode with the effective index of $n_{eff}$=2.315. In one specific embodiment, the structure of waveguide 200 is grown by metalorganic chemical vapor deposition (MOCVD) on the c-plane of sapphire 206. A 4-µm-thick epitaxial film of Al$_{0.03}$Ga$_{0.97}$N is grown on sapphire 206 to form Al$_{0.03}$Ga$_{0.97}$N substrate 204. A 3-µm-thick GaN film is deposited on the top of Al$_{0.03}$Ga$_{0.97}$N substrate 204. Then, waveguide 200 is fabricated by photolithographic patterning and inductively coupled plasma (ICP) dry etching. To form GaN waveguide core 202, the etching depth is controlled at approximately 2.8 µm, and the waveguide width is controlled at approximately 3 µm. The length of waveguide 200 is in a range of about 1.5 mm to 3 mm. In one embodiment, the waveguide is coated with wavelength selective coatings at each end to provide high reflection for the short wavelength photons and low reflection for the IR wavelength optical signals.

Figure 2B:
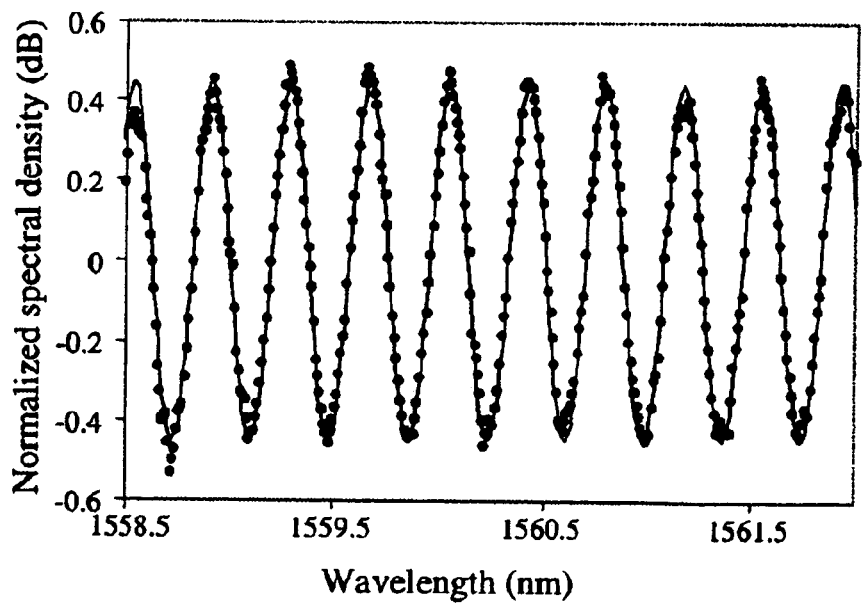
FIG. 2B is a graph showing measured optical transmission spectrum (solid points) of a 1.395 mm-long optical waveguide of FIG. 2A and numerical fitting using a Fabry-Perot equation (continuous line), according to one embodiment of the present subject matter.

Based on the measurement of Fabry-Perot (FP) interference caused by the Fresnel reflections of the two end facets of the waveguide, waveguide losses and effective indices were evaluated and compared to the theoretical predictions. As an example, FIG. 2B shows a typical FP transfer function measured on an 1.395 mm-long waveguide 200. By fitting the measured spectrum to a normalized FP transfer function, an effective index of $n_{eff}$=2.315 is confirmed, and a waveguide absorption loss is approximately 4.8 dB. Although the index was evaluated by fitting the period of the ripple as shown in FIG. 2B, the evaluation of waveguide loss depends on the actual reflectivities of the waveguide end surfaces. It is expected that improvements in the waveguide fabrication process will significantly improve the waveguide absorption loss.

Figure 3:
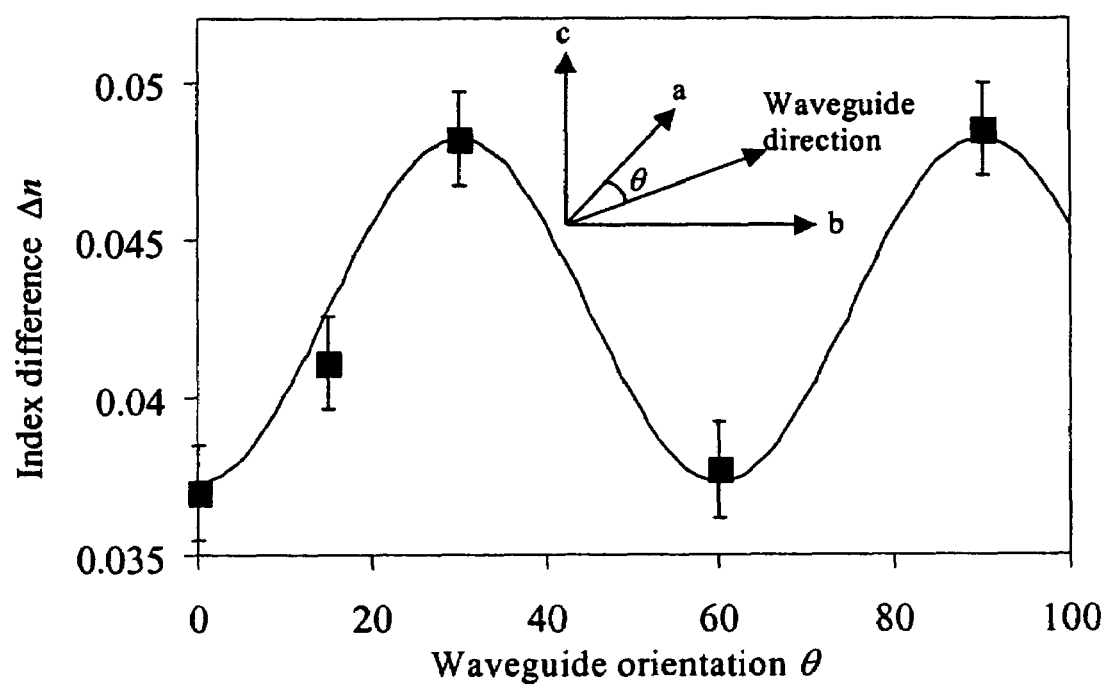
FIG. 3 is a graph showing measured birefringence in GaN/AlGaN waveguide versus the waveguide orientation, according to one embodiment of the present subject matter.

We also observed birefringence in GaN/AlGaN waveguide devices operating in the 1550 nm wavelength region. By employing a polarized optical signal, we have determined the index difference $\Delta n = n_\perp - n_{//}$ between the optical signal perpendicular and parallel to the film c-axis. For GaN/AlGaN optical waveguide devices grown on sapphire, the index difference $\Delta n$ is in the vicinity of 2% operating in 1550 nm wavelength. It was confirmed by our beam propagation method simulation that this value is at least 3 orders of magnitude higher than the waveguide structure-induced birefringence. Therefore, this measured birefringence of about 2% is primarily due to the inherent material properties of III-nitrides, probably related with the polarization of piezoelectric field in the AlGaN/GaN heterostructure. Moreover, it was found that the magnitude of birefringence is a periodic function of the waveguide orientation. FIG. 3 shows the measured birefringence as a function of waveguide orientation. The waveguide orientation is measured with respect to the a-axis of the GaN/AlGaN film. The inset in FIG. 3 illustrates the Cartisian coordinate of GaN crystal. The growth (a-b) plane is perpendicular to the c-axis. FIG. 3 demonstrates a 60° periodicity attributed to the hexagonal structure of the nitride materials. Polarization sensitivity is an important concern in PIC applications. In one embodiment, in order to make the waveguide devices polarization-insensitive, an appropriate strain is introduced in the crystal growth process to compensate for the intrinsic material birefringence.

Figure 4A:
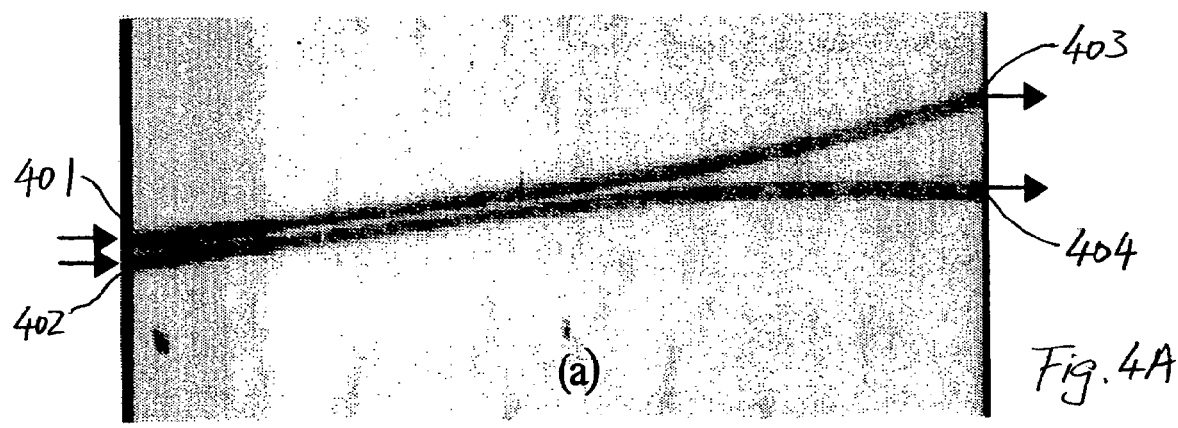
FIG. 4A is an optical microscope image showing a top view of a 3-dB GaN/AlGaN heterostructure waveguide coupler designed for operating in 1550 nm wavelength, according to one embodiment of the present subject matter.
Figure 4B:
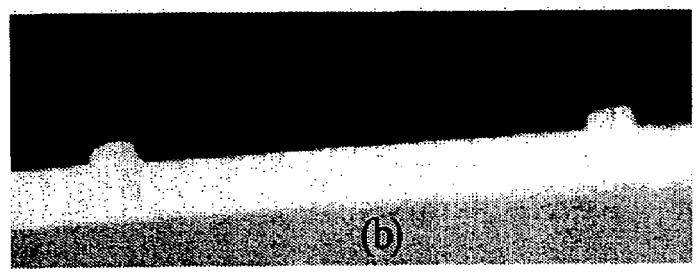
FIG. 4B is an optical microscope image showing a cross-sectional view of the waveguide coupler of FIG. 4A, according to one embodiment of the present subject matter.
Figure 4C:
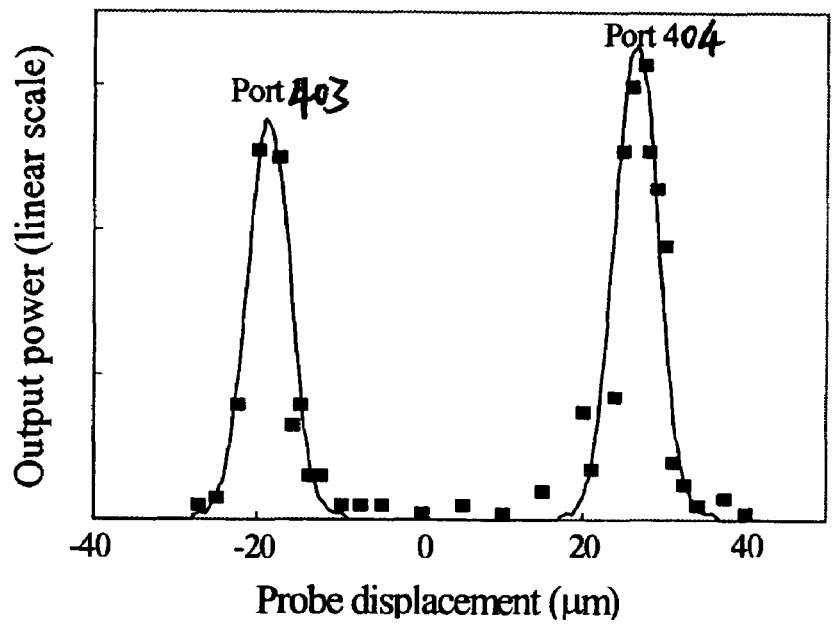
FIG. 4C is a graph showing measured output optical power versus the probe displacement in the horizontal direction at the output of the waveguide coupler of FIG. 4A, according to one embodiment of the present subject matter.

In addition to the fabrication and characterization of single-mode optical waveguide devices based on the GaN/AlGaN heterostructure, we designed functional optical devices for operation in the 1550 nm wavelength region. FIGS. 4A and 4B show an example of a 2×2 AlGaN/GaN hetestructure waveguide optical coupler. The waveguide optical coupler includes input ports 401 and 402 and output ports 403 and 404. When an input optical signal was launched at port 401 on the left hand side of the waveguide coupler, the power output from ports 403 and 404 was measured by scanning the position of a tapered optical fiber probe in the horizontal direction. The result, as shown in FIG. 4C, demonstrates an approximately 50% power splitting realized by this GaN/AlGaN waveguide coupler, thus validating our design.

APPLICATION EXAMPLE 1

Fast Switchable Wavelength Routers

Figure 5:
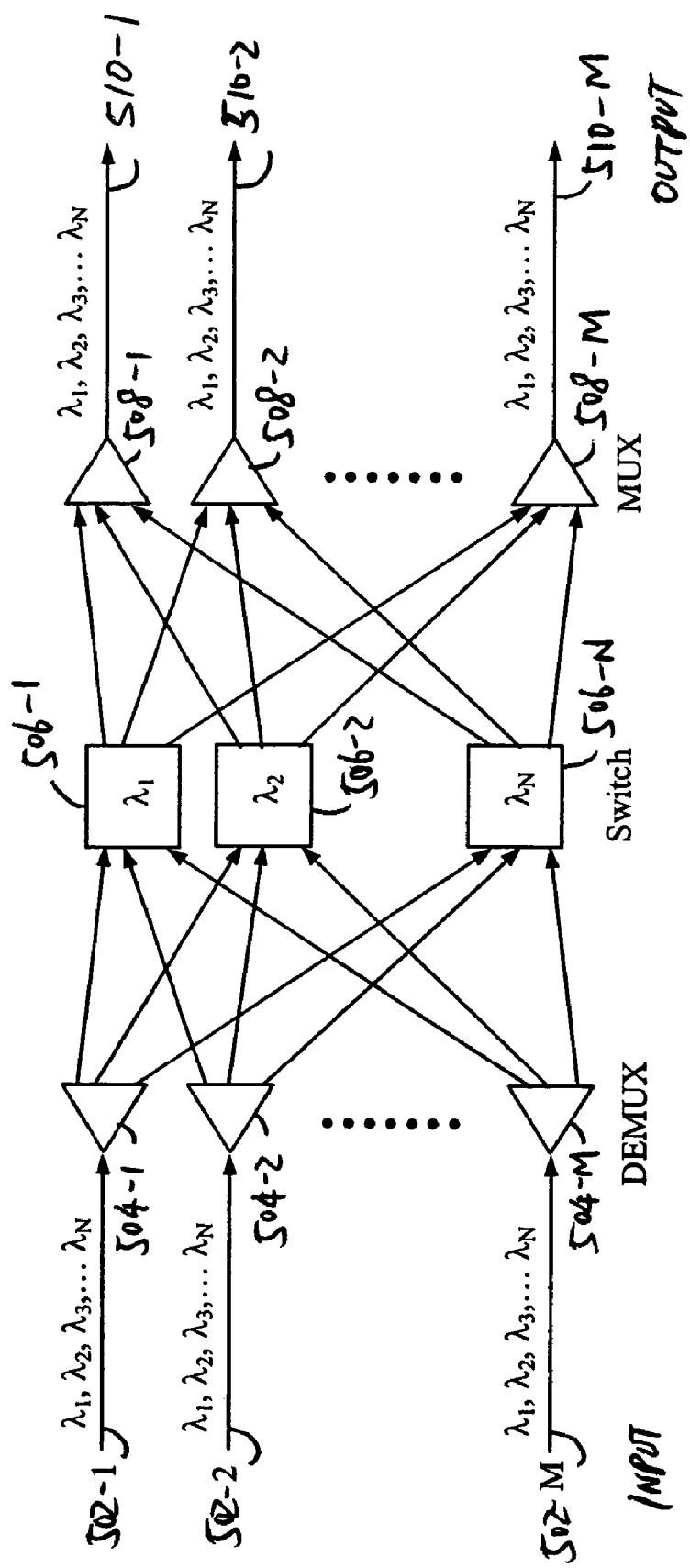
FIG. 5 is a diagram illustrating an all-optical wavelength cross connection router, according to one embodiment of the present subject matter.

In multi-wavelength fiber-optic communication networks, wavelength multiplexing, demultiplexing and wavelength routing are essential functionalities. FIG. 5 illustrates an example of all-optic wavelength cross connection router.

As illustrated in FIG. 5, there are M input optical ports 502-1 through 502-M to the router, and each input has N independent wavelength channels. Depending on the switch control signal, the wavelength router routes each wavelength channel to its designated output being one of M output optical ports 510-1 through 510-M. The operation involves wavelength demultiplexing, optical switching and wavelength multiplexing. All-optical wavelength routing is done by a sub-system as shown in FIG. 5, which contains M 1×N WDM demultiplexers (DEMUXs) 504-1 through 504-M, N M×M space optical switches 506-1 through 506-N, and M N×1 WDM multiplexers (MUXs) 508-1 through 508-M. WDM demultiplexers and multiplexers are typically made by thin-film technology or silica-based AWG technology. Current available optical switches are mechanical. Although micro-electro-mechanical-systems (MEMS) have been studied for several decades now and MEM-based optical switches have been commercialized, mechanical optical switches have their intrinsic problems such as limited lifetime, large size and, most importantly, relatively slow switching speed. Millisecond level switching speed provided by MEM-based switches may be enough for optical circuit switch. However, nanosecond level switching speed is necessary for optical packet switches.

Figure 6B:
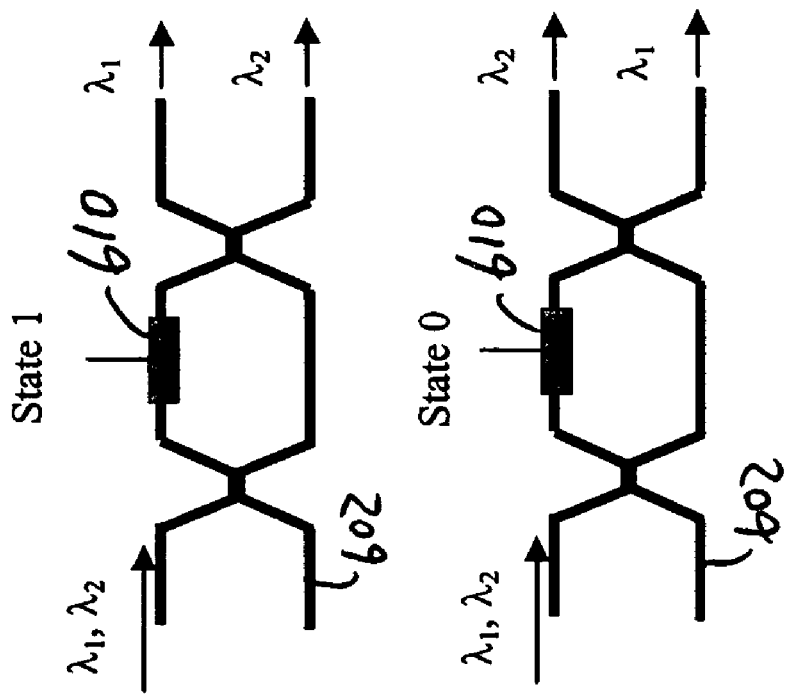
FIG. 6B illustrates the wavelength switching operation of the MZI of FIG. 6A, according to one embodiment of the present subject matter.
Figure 6A:
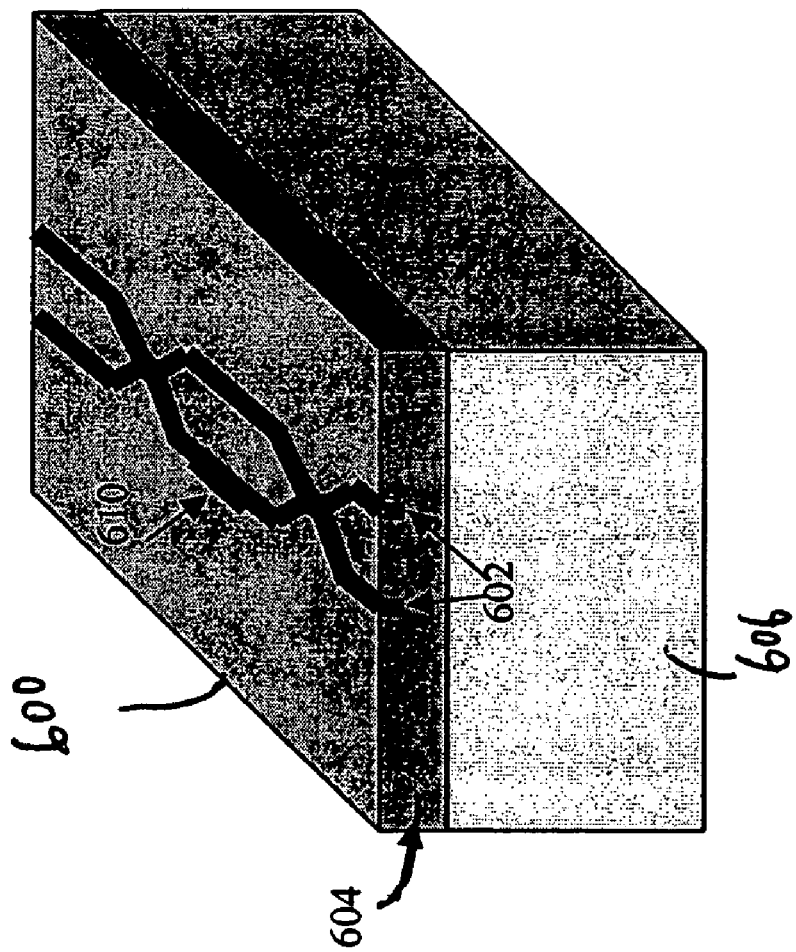
FIG. 6A illustrates a planar optical waveguide Mach-Zehnder interferometer (MZI), according to one embodiment of the present subject matter.

Silica-based planar optical waveguide arrays have been used to make WDM multiplexers and demultiplexers. In principle, switchable optical routers can also be made using planar optical waveguide technology. The simplest PIC wavelength router is a tunable Mach-Zehnder interferometer (MZI). FIG. 6A illustrates an MZI 600 including GaN waveguide core 602, AlGaN substrate 604 grown on sapphire 606, and phase shifter 610. Planar optical waveguides and couplers are formed on a substrate. By changing the differential phase delay between the two March-Zehnder arms, the transfer function of the interferometer can be tuned. In one embodiment, a digitally controlled phase shifter 610 switches two wavelengths between two output ports as shown in FIG. 6B.

Figure 7A:
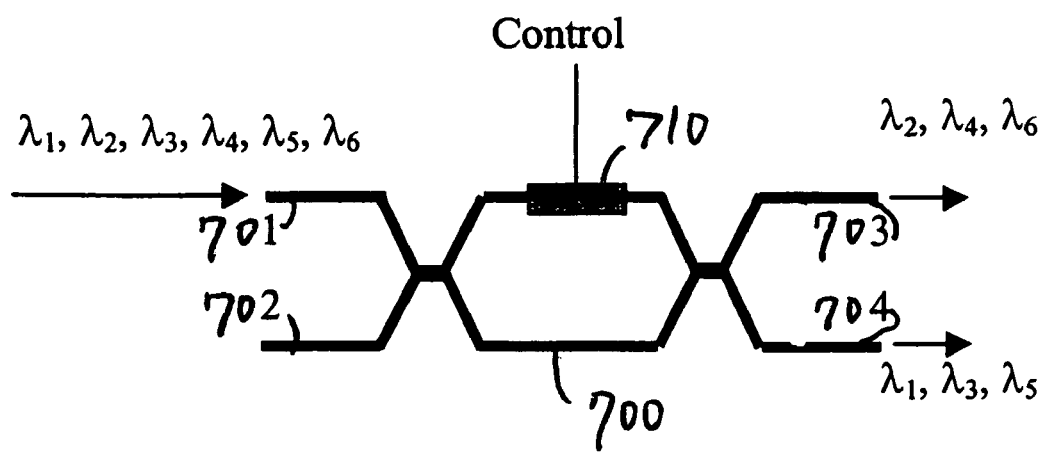
FIG. 7A illustrates the wavelength switching operation of another MZI, according to one embodiment of the present subject matter.
Figure 7B:
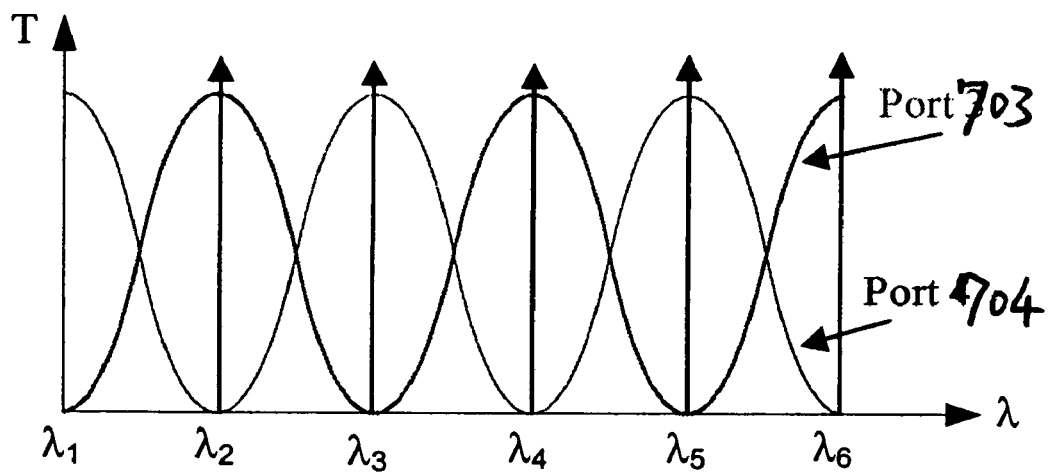
FIG. 7B is a graph showing the transfer functions of the MZI of FIG. 7A, according to one embodiment of the present subject matter.

FIG. 7A more generally illustrates the use of a tunable MZI as the simplest PIC wavelength router. The MZI includes two input ports 701 and 702, two output ports 703 and 704, and a phase shifter 710 to control the wavelength routing. The general transfer function of an MZI is periodic. Because of the energy conservation, the outputs from the two output ports are complementary to each other as shown in FIG. 7B. An MZI can be used as a wavelength interleaver in WDM optical systems, which separates, for example, the even number channels from the odd number channels. In one embodiment, a differential phase delay change is introduced between the two MZI arms. The transfer function of the interferometer is tuned, and the wavelength channels from the two output ports are exchanged. In this embodiment, the switch is categorized as a group switch allowing wavelength selection of either all the even channels output from port 3 (odd channels output from port 4) or all the odd channels output from port 3 (even channels output from port 4).

Figure 8:
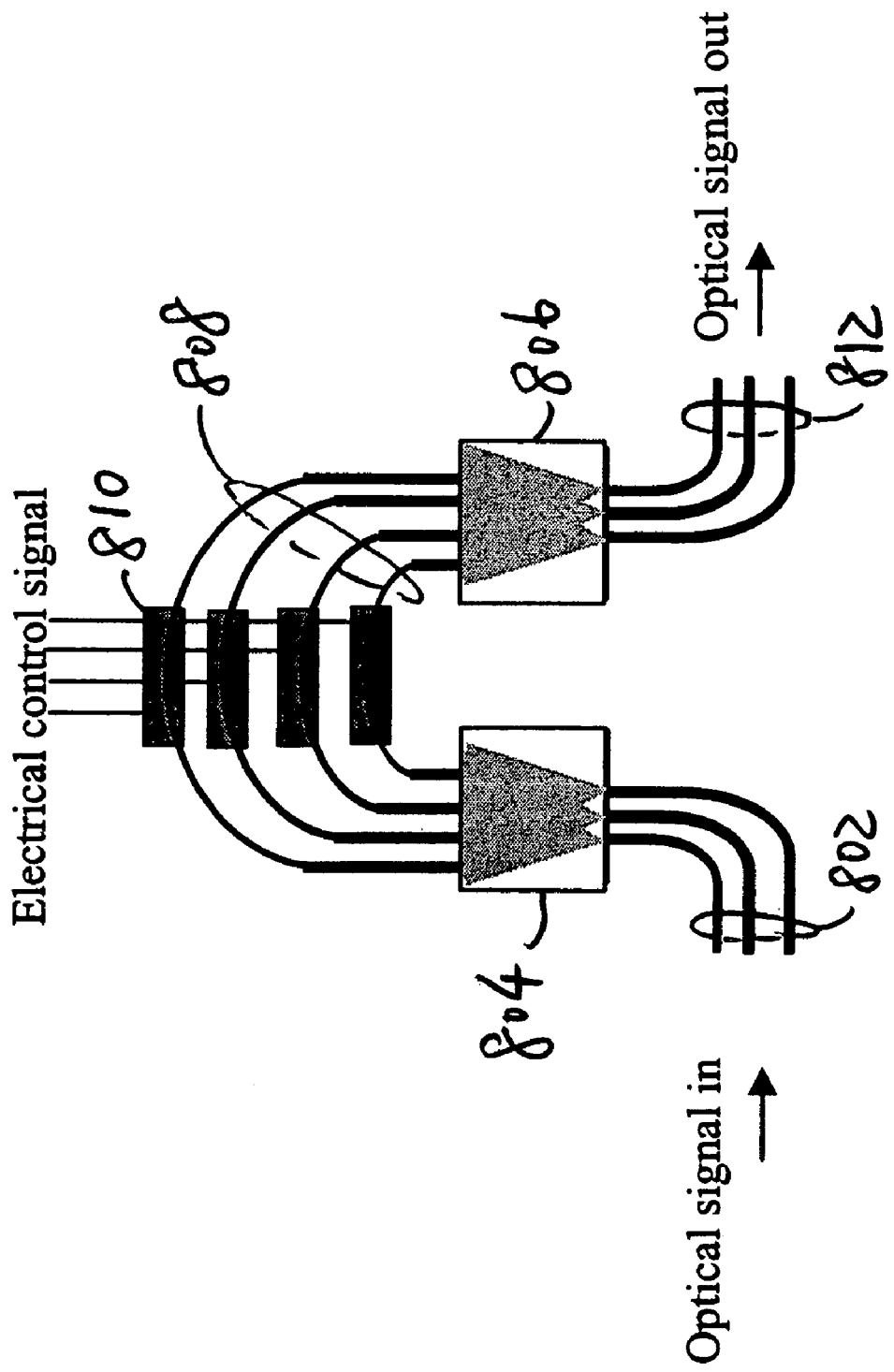
FIG. 8 is a diagram illustrating a tunable arrayed waveguide grating (AWG), according to one embodiment of the present subject matter.

The concept of MZI has been extended into multiple optical waveguide array using PIC technology, which is commonly referred to as optical phasor or AWG. FIG. 8 illustrates an example of AWG. The AWG includes input ports 802, output ports 812, and an array of optical waveguides 808 between two optical star couplers 804 and 806. A phase shifter 810 controls the phase delay in each waveguide of the array of optical waveguides 808. In optical star couplers 804 and 806, the field of each input optical waveguide is imaged onto a number of output optical waveguide in a dispersive way. Array of optical waveguides 808 between the star couplers 804 and 806 provides a differential phase delay, which determines the coherent interference pattern and the wavelength selectivity at each output waveguide.

Materials including silica and InP have been used for making PICs. A silica-based PIC has low propagation loss and high coupling efficiency with optical fibers because of the matched refractive index. By introducing differential heating at different waveguide to change the differential phase delay between waveguides, the phase array can be made switchable for wavelength routing applications. However, due to its passive character, silica has a limited potential for integration of active functions with carrier effects. The speed of thermal tuning is slow, typically in the millisecond level. This speed is obviously not fast enough for optical packet switch applications.

InP-based devices have a better potential for integration of active functions. WDM cross connect in InP has been reported. In this case, adjustment of differential phase delay in the phasor can be accomplished by carrier-induced index change through current injection. However, InP has a much higher refractive index (n=3.2) compared to silica. InP-based optical phasor cannot compete with silica-based devices with respect to fiber coupling loss and scattering loss due to interface mismatch and small waveguide size. This makes InP-based devices less suitable for realization of circuits with a low complexity.

The III-nitride system provides advantages in optical waveguides and integrates active functions due its lower index of refraction. Since III-nitrides are wide bandgap semiconductors, carrier injection induces a change in the refractive index in the IR wavelength region. This carrier-induced refractive index change is a key to the realization of fast switchable optical phasor devices.

Figure 9A:
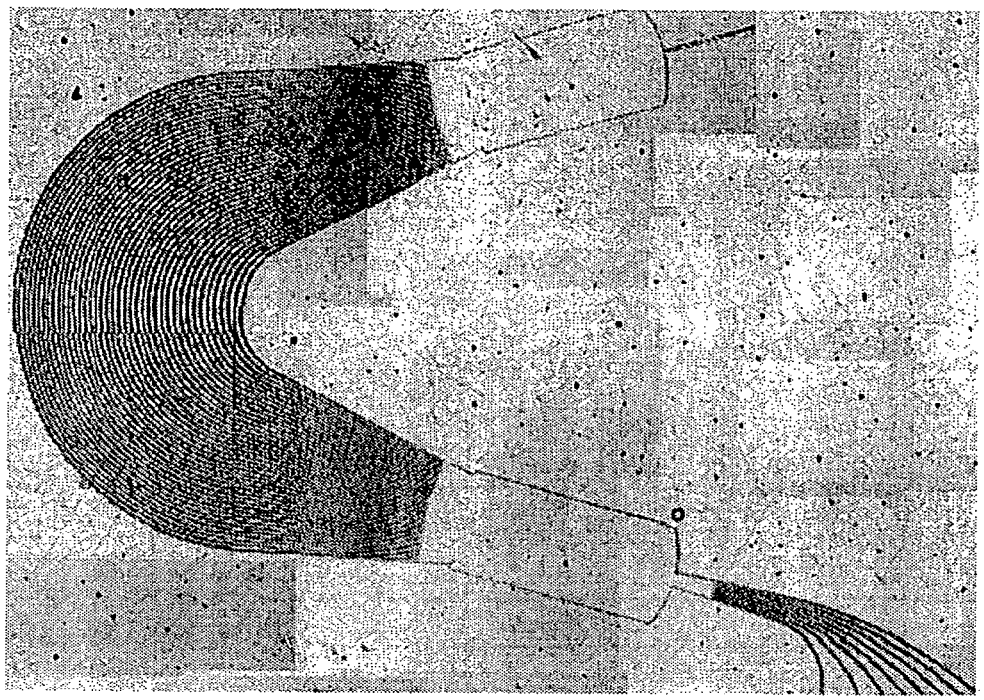
FIG. 9A is an optical microscope image of a 1×8 AWG wavelength demultiplexer based on GaN/AlGaN heterostructures waveguide, according to one embodiment of the present subject matter.
Figure 9B:
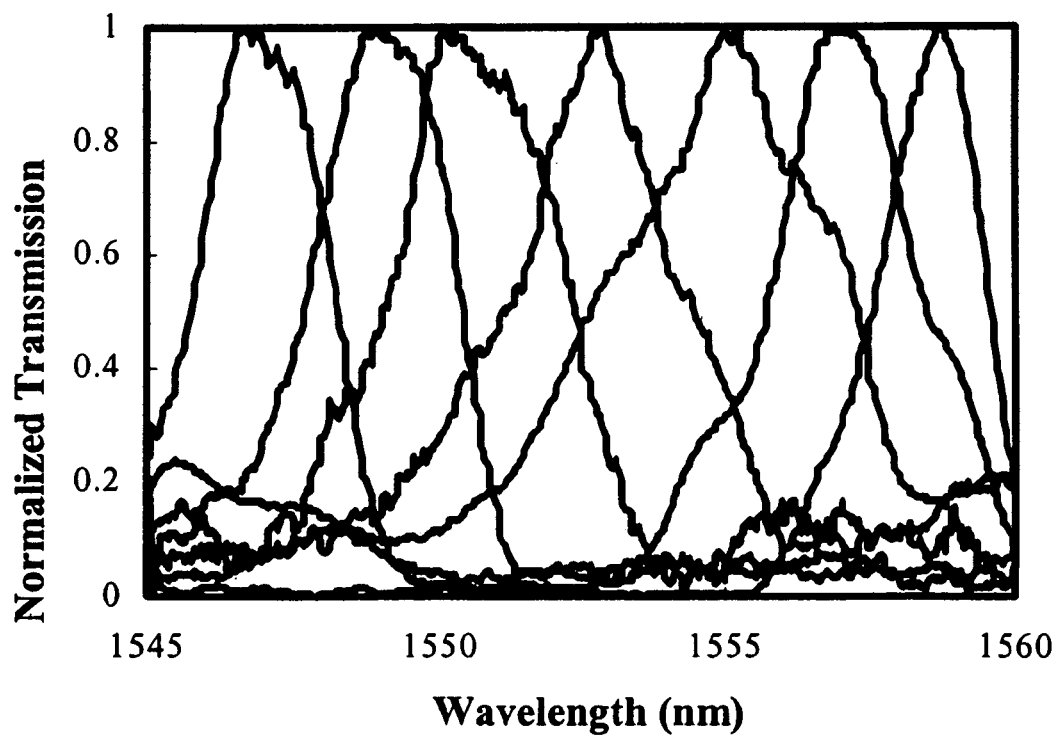
FIG. 9B shows the transfer functions measured at different output ports of the wavelength demultiplexer of FIG. 9A, according to one embodiment of the present subject matter.

In one embodiment, we designed and fabricated various complex PICs based on GaN/AlGaN heterostructure grown on sapphire. FIG. 9A shows a microscope image of an exemplary AWG wavelength demultiplexer with one input port and eight output ports. There are 40 waveguides used between the two star couplers to form the waveguide grating and, by design, the wavelength separation between adjacent output ports is 2 nm. FIG. 9B shows the transfer functions of the AWG measured at different output ports. Although the extinction ratio is not ideal because of the imperfections in the waveguides, the overall optical characteristics validate the design.

Figure 10A:
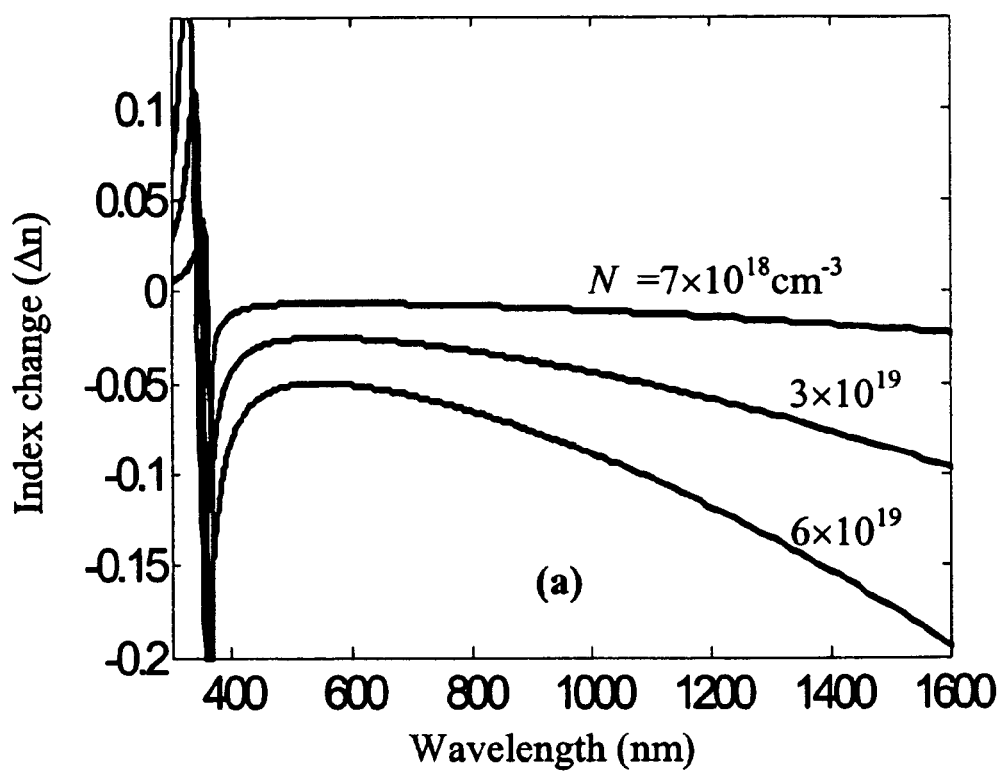
FIG. 10A is a graph showing the overall index change versus wavelength calculated at three carrier density levels, according to one embodiment of the present subject matter.
Figure 10B:
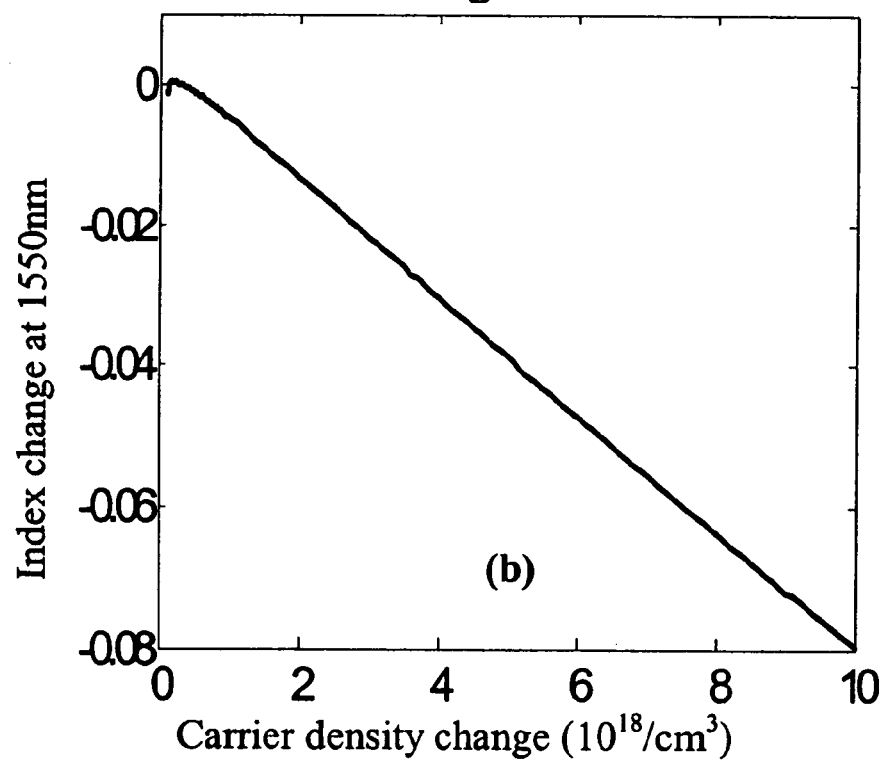
FIG. 10B is a graph showing calculated index change at 1550 nm versus carrier density, according to one embodiment of the present subject matter.

In one embodiment, to add the refractive index tunability into the a PIC device to make a switchable phasor, an AlGaN/GaN p-i-n heterojunction structure is used. This allows effective refractive index of the waveguide to be controlled through carrier injection. We calculated the refractive index change due to the change in the carrier density in a AlGaN/GaN p-i-n heterojunction. The effects of band filling, bandgap shrinkage, and free carrier absorption were included in the calculation. FIG. 10A shows the calculated refractive index change versus wavelength. We found that in the IR wavelength region, free carrier absorption is the dominant effect for the index change. FIG. 10B shows the index change as a function of the carrier density change calculated for the wavelength of 1550 nm.

For optical phasor applications, the refractive index change of the waveguide should be large enough such that the optical length can be changed by half of the signal wavelength. For a 1 mm electrode length on the waveguide and the wavelength at 1550 nm, the minimum required refractive index change should be approximately 0.0775%. FIG. 10B indicates that this can be achieved by a carrier density change of $1 \times 10^8$ cm$^{-3}$, which is generally feasible.

Figure 11:
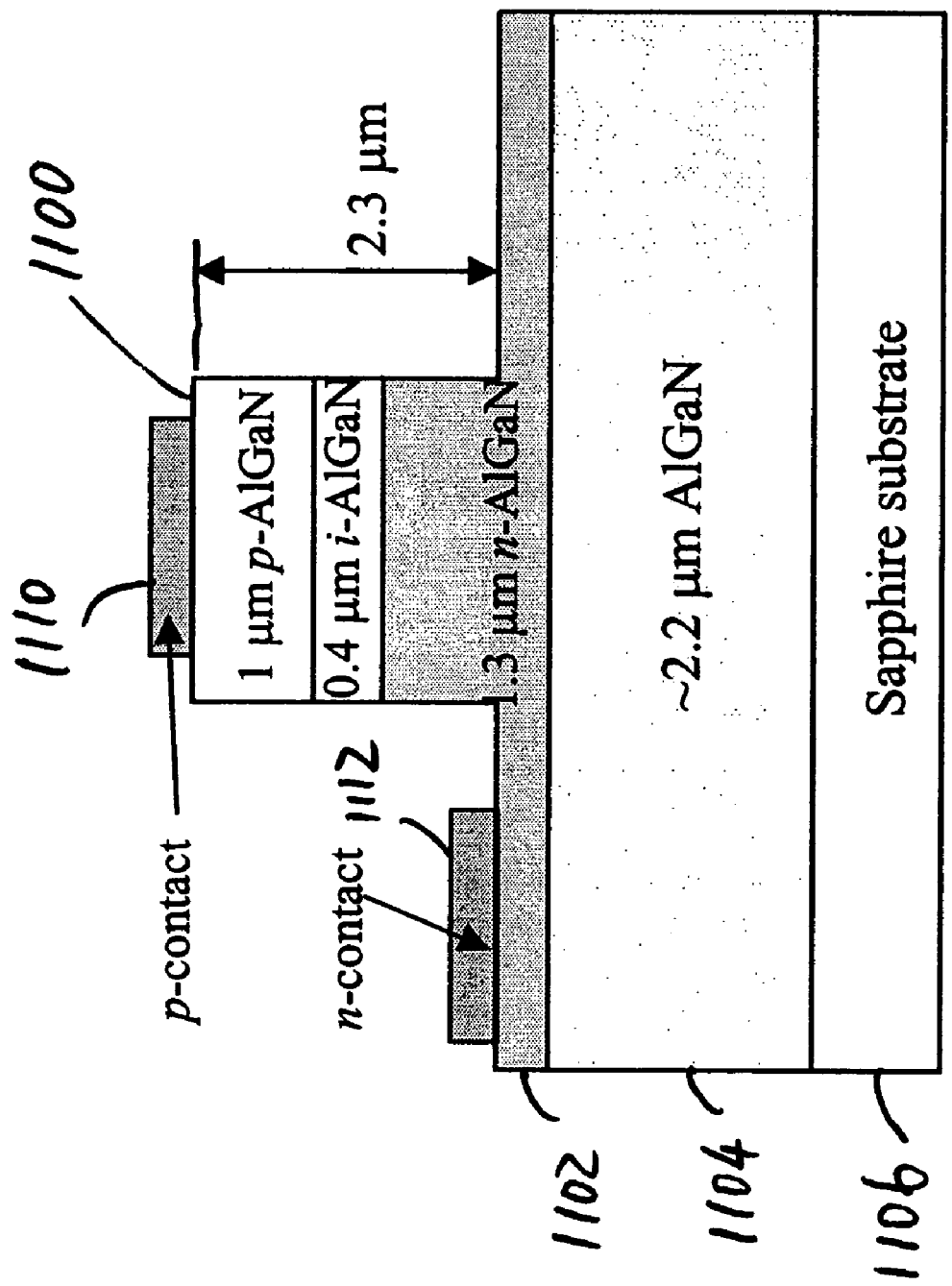
FIG. 11 illustrates a cross-section of an AlGaN/GaN p-i-n heterojunction waveguide design, according to one embodiment of the present subject matter.

In one embodiment, to make integrated optical circuits switchable through refractive index modulation, p-i-n heterojunction is embedded into the PIC waveguides. FIG. 11 illustrates one embodiment of an AlGaN/GaN p-i-n heterojunction structure 1100 with added electrodes 1110 and 1112 for carrier injection. AlGaN/GaN p-i-n heterojunction structure 1100 includes waveguide core 1102 including a p-AlGaN epilayer, an i-AlGaN layer, and an n-AlGaN epilayer. Waveguide core 1102 is on AlGaN substrate 1104, which is grown on sapphire 1106. Si was doped to obtain n-epilayers, and Mg was doped to obtain p-epilayers. The initial results of characterization suggested a higher attenuation compared to a simple GaN/AlGaN ridge waveguide. This might be caused by the Si and Mg doping as well as the p-i-n heterojunction structure. In order to create switchable PIC devices with acceptable performance, both the doped material and the p-i-n heterojunction are to be optimized. In one embodiment, the optimization includes providing varying growth conditions such as temperature, V/III ratio, growth rate and pressure. In one embodiment, the optimization includes providing p-i-n heterojunction structures with different doping concentrations of the n- and p-layers, different i-layer thickness, and different Al content of $Al_xGa_{1-x}N$ alloys. X-ray diffraction (XRD), atomic force microscopy (AFM), Hall-measurements, and photonic luminance (PL) are used to monitor the material quality, surface morphology, and carrier concentration. In further embodiments, the optical, electrical, and structural properties of the p-i-n-structures are optimized, especially those of p-type layer and AlGaN layer. Dislocation density is monitored by measuring the density of etching pits of the structures by SEM and AFM. Time-resolved PL measurements is employed to monitor the relative density of non-radiative recombination centers in the waveguide structures. The electrical transport properties is monitored by variable temperature Hall-effect measurements to identify the optimal growth conditions for the p-layer.

In one embodiment, waveguide devices are patterned by photolithography and (ICP) dry etching. Bilayers of Ni (20 nm)/Au (200 nm) and Al (300 nm)/Ti (20 nm) are deposited by electron beam evaporation as p- and n-type Ohmic contacts, respectively. The waveguide devices are subjected to subsequent thermal annealing in nitrogen ambient at 650° C. for 5 min. A dielectric layer, $SiO_2$ is deposited by e-beam evaporation after the waveguide formation for the purpose of isolating p-type contacts from the etch-exposed n-type layer. Although the waveguide structures fabrication procedures is similar to those of III-nitrides blue and UV LEDs, special attention is directed to the optimization of device performance in the IR wavelength region. For example, the property that free carrier absorption is the dominant effect for the index change caused by carrier injection, as discussed above, can be utilized to increase the index modulation efficiency.

An important issue for using III-nitrides in PICs is the material birefringence. The effect of birefringence makes the optical circuits polarization-dependent, which is not acceptable in practical optical communications. Approaches to eliminating the effect of birefringence include, but are not limited to, polarization diversity, special waveguide cross-section design, and strain control during the crystal growth. Among these, strain engineering has been the most popular method because it is insensitive to device configurations and functionalities. The built-in strain in the film may be caused by crystal lattice mismatch, impurity doping and dislocation.

Various optical switch architectures have been proposed and demonstrated using InP-based PLC technology. However, from the functionality point of view, they perform as either a group switch or a cyclic switch. On the other hand, III-nitride based PLC technology provides for a flexible and scalable device to enable any-to-any switch functionality in packet switched optical networks as illustrated in FIG. 5.

Figure 12:
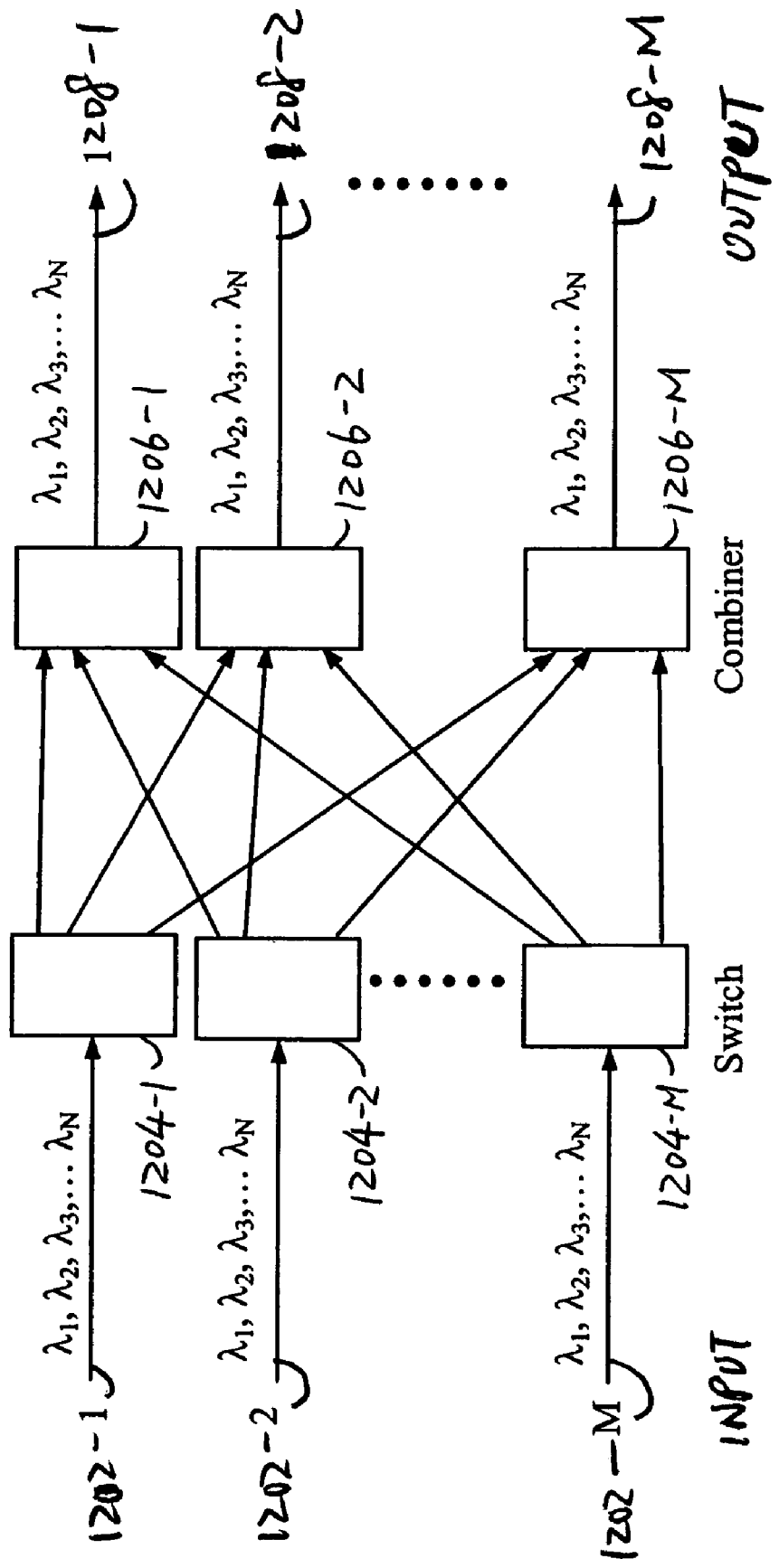
FIG. 12 is a diagram illustrating the architecture of a multi-port wavelength router, according to one embodiment of the present subject matter.
Figure 13:
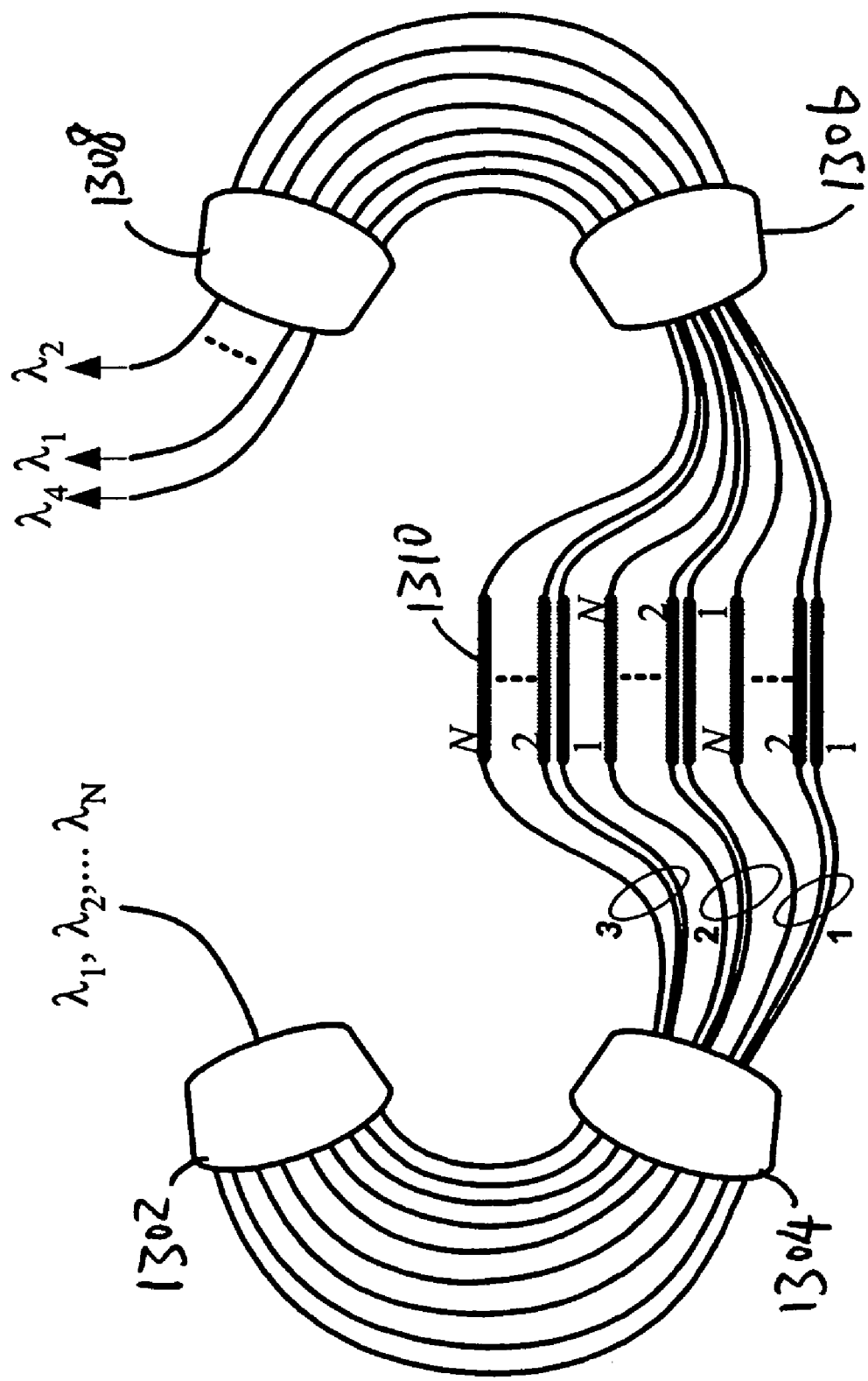
FIG. 13 is a diagram illustrating an optical circuit configuration of a wavelength router subsystem allowing any of N input wavelength channels to be routed to any of N output ports, according to one embodiment of the present subject matter.

FIG. 12 illustrates one embodiment of an architecture of a multi-port wavelength router including M input ports 1202-1 through 1202-M and M output ports 1208-1 through 1208-M. As shown in FIG. 12, wavelength routers 1204-1 through 1204-M are each 1×N wavelength routers having one input port and N output ports. Each wavelength router is able to direct any wavelength channel at the input to any output port with each output port carrying only one wavelength. Then, the output from the wavelength routers are regrouped and recombined by elements 1206-1 through 1206-M, which are power combiners or N×1 wavelength routers, to form new groups of WDM signals for M output ports 1208-1 through 1208-M. In this embodiment, the key component is the 1×N wavelength router, which can be realized by integrated PIC technology as shown in FIG. 13. FIG. 13 illustrates an embodiment of a device that uses two specially designed interleaving AWGs for channel partitioning and redistribution. A multi-beam optical phase shift section is sandwiched between the two AWGs for the purpose of switch control. The two AWGs in FIG. 13 are different from each other. The first AWG, which includes star couplers 1302 and 1304, has three sets of interleaving gratings and every third waveguide arms in the arrayed is added an additional path length of $\lambda_c/3$. There are three separate Brillouin zones created at the output of star coupler B and there are N waveguides within each Brillouin zone for the N input wavelengths. Therefore, each input signal wavelength has three copies at the output of the first AWG. After passing through separate delay lines, they combine and interfere at the second AWG, which includes star couplers 1306 and 1308. The second AWG includes N sets of interleaving gratings and N separate outputs. The angular separation of the outputs is equivalent to the separation of the corresponding Brillouin zones. The wavelength selected by each output waveguide depends on the specific setting of relative phase delays provided by phase shifters 1310.

III-nitrides appear to be excellent materials to make optical waveguides and integrate active functions due its lower index of refraction. Since III-nitrides are wide bandgap semiconductors, carrier injection can induce a change in the refractive index in the IR wavelength region without increasing the optical loss. This carrier-induced index change is a key to the realization of fast switchable optical phasor devices.

APPLICATION EXAMPLE 2

Waveguide Optical Amplifier Using Erbium-doped III-nitride Semiconductors

An optical amplifier is one of the most important and fundamental devices in fiber-optic communication networks. Two types of commercially available optical amplifiers are SOA and EDFA.

Usually an SOA is made by anti-refraction coating at each side of a semiconductor laser to disable the cavity effect. SOAs operating in the 1550 nm wavelength window are typically made by InGaAsP. SOAs are electrically pumped and have small sizes. However, due to the nature of the band-to-band recombination in semiconductors, carrier lifetime is usually short, in the sub-nanosecond range, SOAs are not suitable for using in WDM systems to amplify multi-wavelength optical signals. The reason is that the cross-gain saturation may induce unacceptable crosstalk between different wavelength channels. Therefore, EDFAs are more popular in WDM optical communication systems.

An EDFA is made by a piece of Er-doped optical fiber and an external optical pump. Powerful optical pump injecting into the Er-doped fiber creates population inversion of the erbium, thus providing a gain medium for incoming optical signals in the 1550 nm wavelength window. Since the carrier lifetime in the metastable state of the erbium is in the order of 10 ms, the optical gain variation is much slower than signal data rate. Therefore, cross gain saturation between different wavelength channels is not likely to happen. Currently, pump sources at 1480 nm and 980 nm wavelengths are often used. The efficiency of the external pumping is determined by the absorption spectrum of $Er^{+3}$ ions.

Figure 14:
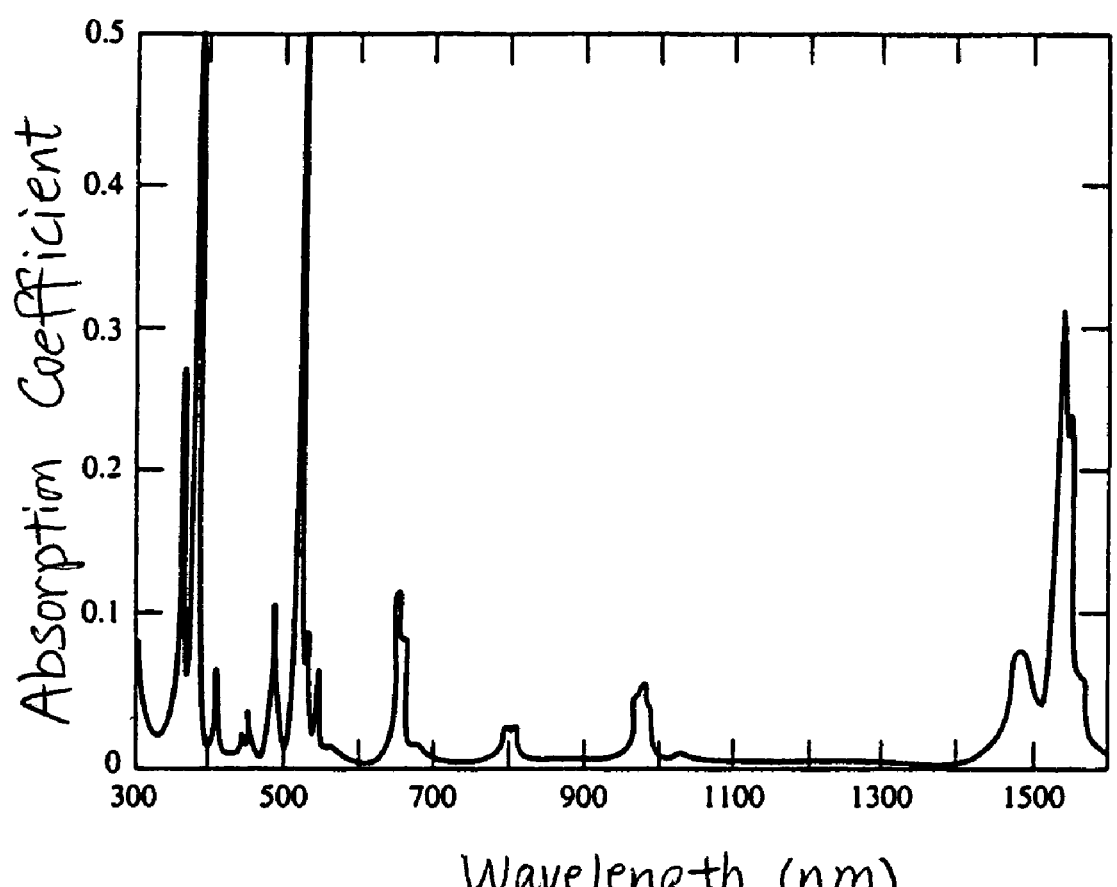
FIG. 14 is a graph showing absorption spectrum of an erbium (Er)-doped silicate glass.

FIG. 14 is a graph showing the absorption spectrum of an Er-doped silicate glass. Although external pumping at a wavelength lower than 700 nm has higher absorption efficiency, the difficulty of finding good semiconductor laser sources limits pumping to mainly 1480 nm and 980 nm. Because of the low absorption efficiency for the external pump at 980 nm or 1480 =m, the EDFAs are much longer than SOAs. Typical length of an EDFA is in the order of 20 meters.

The present subject matter provides embodiments of electrically pumped waveguide optical amplifiers for WDM optical networks based on Er-doped GaN/InGaN quantum well LEDs. For optical amplifier applications, long term reliability is important and therefore so are high optical power and low sensitivity to temperature variations. For example, in low-cost residential area optical interconnections, temperature control is usually not provided and the range of temperature variation can be substantial. III-nitride semiconductors are used as host materials for erbium ions. In particular, GaN and AlGaN epilayers doped with erbium ions have shown a highly reduced thermal quenching of the erbium luminescence intensity from cryogenic to elevated temperatures, as compared to other semiconductor host materials. The remarkable thermal stability of the light emission may be due to the large energy bandgap of the III-nitride materials, as well as to the optical inactivity of material defects in III-nitride films. These properties allow us to fabricate novel electrically pumped waveguide optical amplifiers with advantages of both SOAs and EDFAs.

Figure 15A:
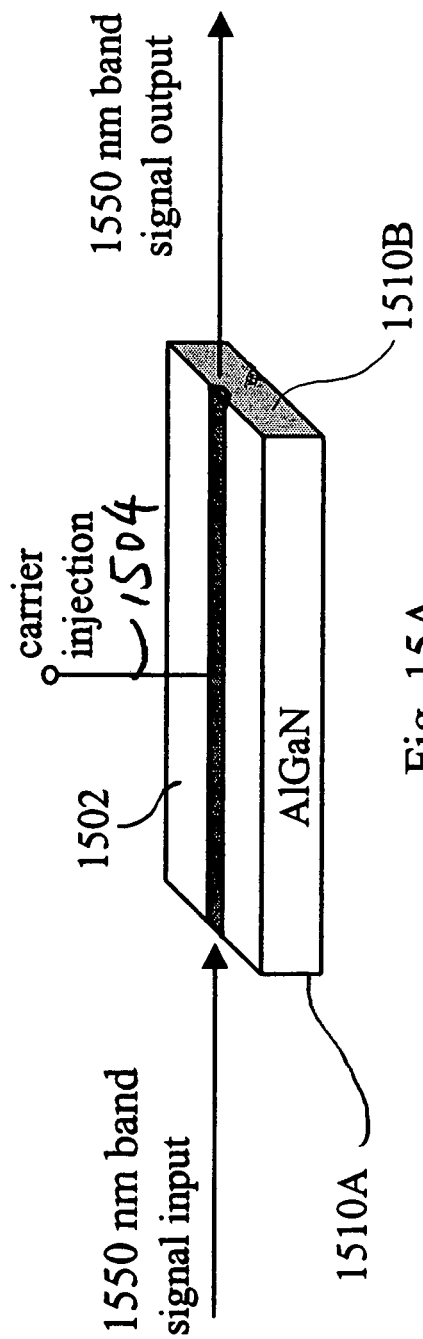
FIG. 15A illustrates an Er-doped GaN/AlGaN optical waveguide with wavelength selective facet coatings, according to one embodiment of the present subject matter.
Figure 15B:
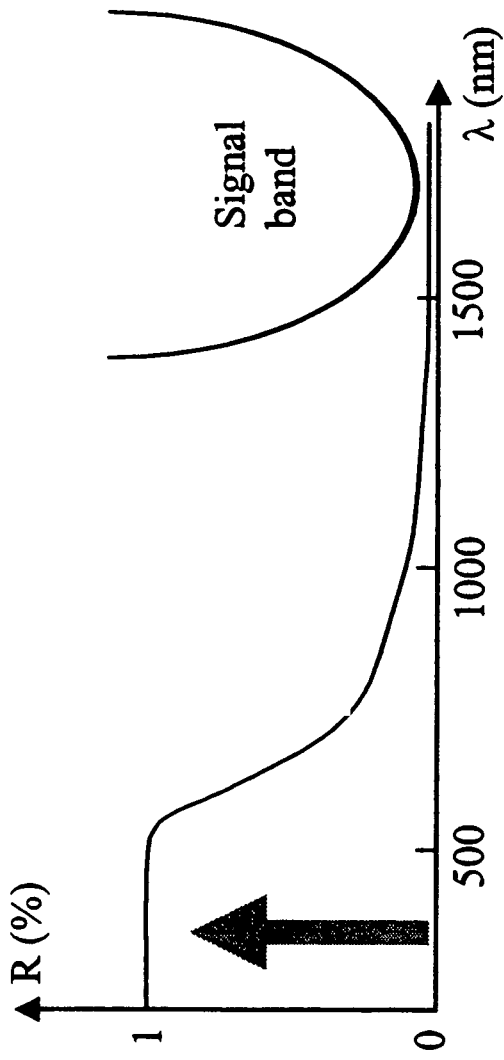
FIG. 15B is a graph showing facet reflectivity vs. wavelength for the Er-doped GaN/AlGaN optical waveguide of FIG. 15A, according to one embodiment of the present subject matter.

It was seen in Er-implanted GaN films that visible emission in the green-red spectral region is also highly efficient, which suppressed greatly the emission efficiency in the IR region. One of the advantages provided by the present subject matter is that varying embodiments provide mechanisms that enhance the erbium emission in the 1550 nm wavelength region and suppress the emission at short wavelengths. In one embodiment, one efficient way to achieve this is to coat the waveguides with wavelength selective coatings at each end to provide high reflection for the short wavelength photons and low reflection for the IR wavelength optical signals. FIG. 15A illustrates an Er-doped GaN/AlGaN optical waveguide 1502 with wavelength selective facet coatings 1510A-B. Waveguide 1502 includes electrical contacts 1504 for carrier injection. FIG. 15B shows facet reflectivity versus wavelength for waveguide 1502. In the arrangement illustrated in FIG. 15A, the photons corresponding to the band-edge recombination may be confined within the waveguide until they are absorbed by the erbium. On the other hand, the waveguide will operate as a traveling wave optical amplifier for the IR wavelength signals.

Since the optical amplification is based on the population inversion of erbium ions, the carriers will have much longer lifetime than those of conventional SOAs. Therefore, it will not introduce interchannel crosstalks in WDM optical systems. Compare to EDFAs, this Er-doped GaN amplifier will have several advantages, including, but not being limited to, the following:

Compact size. Er ions in III-nitrides have much higher absorption efficiency at shorter wavelengths (the band-to-band recombination in GaN host crystal around 3.4 eV serves as an excitation source for Er ions in this case), that makes the absorption length much shorter compared to pumping at 980 nm.

Electrical pumping instead of optical pumping. This makes the optical amplifier much simpler in the optical configuration.

Optical integration of functional devices. This is an important step towards all-optical integrated circuits.

In General

It is to be understood that the above description, including the APPLICATION EXAMPLES 1 and 2, is intended to be illustrative, and not restrictive. Other embodiments will be apparent to those of skill in the art upon reviewing and understanding the above description. The scope of the invention should, therefore, be determined with reference to the appended claims, along with the full scope of equivalents to which such claims are entitled.

What is claimed is:

1. An optical device, comprising:
    an optical waveguide device fabricated using a III-nitride semiconductor material including GaN, the optical waveguide device including a GaN/GaN alloy heterostructure including a waveguide core made of GaN and a substrate made of a GaN alloy including GaN and InAlN (InAlGaN); and
    electrodes in contact with the waveguide device, the electrodes configured to control a refractive index of the waveguide providing for an electrically controllable refractive index, the optical waveguide device configured for applications in an infrared wavelength region.

2. The optical device of claim 1, wherein the optical waveguide device is an optical amplifier adapted to amplify infrared wavelength optical signals.

3. The optical device of claim 2, wherein erbium is doped into the GaN/GaN alloy heterostructure.

4. The optical device of claim 3, wherein portions of the waveguide device are coated with wavelength selective coatings to provide high reflection for short wavelength photons and low reflection for infrared wavelength optical signals.

5. The optical device of claim 1, wherein the substrate made of the GaN alloy is grown on sapphire.

6. The optical device of claim 1, wherein the substrate made of the GaN alloy is grown on silicon carbide (SiC).

7. The optical device of claim 1, wherein the substrate made of the GaN alloy is grown on silicon (Si).

8. The optical device of claim 1, wherein the substrate made of the GaN alloy is grown on gallium arsenide (GaAs).

9. The optical device of claim 1, wherein the electrodes in contact with the waveguide device include:
    a p-i-n heterojunction including a p-epilayer and an n-epilayer embedded into the optical waveguide device, a p-contact electrode attached to the p-epilayer, and an n-contact electrode attached to the n-epilayer, to allow control of the refractive index by carrier injection.

10. The optical device of claim 1, wherein the optical waveguide device comprises a waveguide optical coupler including a plurality of optical waveguides each fabricated using the III-nitride semiconductor material.

11. The optical device 1, wherein the optical waveguide device includes an optical wavelength router including a plurality of optical waveguides each fabricated using the III-nitride semiconductor material.

12. An optical device, comprising:
    an optical waveguide device fabricated using an erbium-doped III-nitride semiconductor material including erbium-doped GaN, the optical waveguide device comprising:
    an erbium-doped GaN/GaN alloy heterostructure including a waveguide core made of erbium-doped GaN and a substrate made of an erbium-doped GaN alloy including erbium-doped GaN and erbium-doped InAlN (erbium-doped InAlGaN);
    an electrode connected to the optical waveguide device for carrier injection;
    input and output ends; and
    a wavelength selective coating applied to the input and output ends, wherein the waveguide selective coating is adapted to provide for low reflection of light in the 1550 nm wavelength region, and high reflection of light in the shorter wavelength region.

13. The optical device of claim 12, wherein the substrate made of the erbium-doped GaN alloy is grown on sapphire.

14. The optical device of claim 12, wherein the substrate made of the erbium-doped GaN alloy is grown on silicon carbide (SiC).

15. The optical device of claim 12, wherein the substrate made of the erbium-doped GaN alloy is grown on silicon (Si).

16. The optical device of claim 12, wherein the substrate made of the erbium-doped GaN alloy is grown on gallium arsenide (GaAs).

17. The optical device of claim 12, wherein a p-i-n heterojunction including an p-epilayer and an n-epilayer is embedded into the optical waveguide device, and wherein a p-contact electrode is attached to the p-epilayer, and an n-contact electrode is attached to the n-epilayer, to allow control of the refractive index by carrier injection.

18. The optical device of claim 12, wherein the optical waveguide device is an optical amplifier adapted to amplify infrared wavelength optical signals.

19. The optical device of claim 12, wherein the optical waveguide device comprises a waveguide optical coupler including a plurality of optical waveguides each fabricated using the III-nitride semiconductor material.

20. The optical device of claim 12, wherein the optical waveguide device includes an optical wavelength router including a plurality of optical waveguides each fabricated using the III-nitride semiconductor material.

21. An optical device, comprising:
a plurality of waveguides wherein at least one waveguide of the plurality of waveguides is fabricated using III-nitride semiconductor material including GaN, the at least one waveguide configured for applications in an infrared wavelength region and including a GaN/GaN alloy heterostructure including a waveguide core made of GaN and a substrate made of a GaN alloy including GaN and InAlN (InAlGaN); and
carrier injection means for electrically adjusting a refractive index of the at least one waveguide.

22. The optical device of claim 21, wherein each waveguide of the plurality of waveguides is fabricated using III-nitride semiconductor material, and wherein the carrier injection application means comprises voltage application means for adjusting a refractive index of the each waveguide.

23. The optical device of claim 22, further comprising a first array waveguide grating (AWG) and a second AWG, wherein the plurality of waveguides is coupled between the first AWG and the second AWG.

24. The optical device of claim 22, further comprising a first optical star coupler and a second optical star coupler, wherein the plurality of waveguides is coupled between the first optical star coupler and the second optical star coupler.

25. The optical device of claim 22, further comprising an optical multiplexer optically connected to the plurality of waveguides.

26. The optical device of claim 22, further comprising an optical power combiner optically connected to the plurality of waveguides.

27. The optical device of claim 22, further comprising an optical demultiplexer optically connected to the plurality of waveguides.

28. The optical device of claim 21, wherein the at least one waveguide of the plurality of waveguides is an optical amplifier configured to amplify infrared wavelength optical signals.

29. The optical device of claim 28, wherein erbium is doped into the GaN/GaN alloy heterostructure.

30. The optical device of claim 29, wherein portions of the at least one waveguide of the plurality of waveguides are coated with wavelength selective coatings to provide high reflection for short wavelength photons and low reflection for infrared wavelength optical signals.

31. The optical device of claim 21, wherein the substrate made of the GaN alloy is grown on sapphire.

32. An optical device, comprising:
a plurality of waveguides wherein at least one waveguide of the plurality of waveguides is fabricated using III-nitride semiconductor material; and
carrier injection means for electrically adjusting a refractive index of the at least one waveguide,
wherein the at least one waveguide of the plurality of waveguides comprises a GaN/GaN alloy heterostructure including a waveguide core made of GaN and a substrate made of a GaN alloy including GaN and InAlN (InAlGaN).

* * * * *